United States Patent
Ferrari et al.

(10) Patent No.: US 6,910,400 B2
(45) Date of Patent: Jun. 28, 2005

(54) MACHINE TOOL

(75) Inventors: Maurizio Ferrari, Pizzighettone (IT); Carlo Massari, San Giorgio (IT)

(73) Assignee: Jobs S.p.A., Piacenza (IT)

( * ) Notice: Subject to any disclaimer, the term of this patent is extended or adjusted under 35 U.S.C. 154(b) by 0 days.

(21) Appl. No.: 09/946,338

(22) Filed: Sep. 6, 2001

(65) Prior Publication Data

US 2002/0047319 A1 Apr. 25, 2002

(30) Foreign Application Priority Data

Sep. 13, 2000 (IT) .................................. BO2000A0529

(51) Int. Cl.[7] .............................................. G05G 11/00
(52) U.S. Cl. .......................... 74/490.1; 74/110; 185/37
(58) Field of Search ......................... 74/110, 479.01, 74/480 R, 490.1; 185/37; 310/12, 15, 17; 901/48

(56) References Cited

U.S. PATENT DOCUMENTS

| | | | | |
|---|---|---|---|---|
| 3,988,965 A | | 11/1976 | Cayen et al. | |
| 4,149,822 A | * | 4/1979 | Lehmkuhl | 408/235 |
| 4,705,447 A | * | 11/1987 | Smith | 901/48 |
| 4,954,043 A | * | 9/1990 | Yoshida et al. | 901/48 |
| 5,299,662 A | * | 4/1994 | Reddy et al. | 310/13 |
| 5,416,397 A | * | 5/1995 | Mazzara et al. | 318/696 |
| 5,931,234 A | * | 8/1999 | Trowbridge | 172/446 |
| 5,944,896 A | * | 8/1999 | Landesman et al. | 118/500 |
| 6,066,078 A | | 5/2000 | Koelblin et al. | |

FOREIGN PATENT DOCUMENTS

| | | |
|---|---|---|
| EP | 0546273 | 6/1993 |
| EP | 0893196 | 1/1999 |
| JP | 61-103714 | 5/1986 |

* cited by examiner

Primary Examiner—David A. Bucci
Assistant Examiner—Timothy McAnulty
(74) Attorney, Agent, or Firm—Harbin King & Klima

(57) ABSTRACT

In a machine tool comprising a spindle mounting slide which is driven by a linear electric motor and which runs in a vertical direction in a slideway, the slide is equipped with a counterweighting device comprising an elastic element and a roller chain, the rigidity of the chain being less than the rigidity of the elastic element.

8 Claims, 3 Drawing Sheets

MACHINE TOOL

BACKGROUND OF THE INVENTION

The present invention relates to a device for driving a spindle mounting slide.

The invention relates in particular to a device for driving the spindle mounting slide in a machine tool supported by a frame and controlled by linear motors that drive the tool at high speed along one or more axes.

In modern automatic machine tools, the tool is usually mounted on a supporting element driven by linear motors along three axes which are perpendicular to each other.

Some automatic machine tools known in prior art comprise a linear electric motor which provides at least the vertical drive for the spindle mounting slide. The linear electric motor comprises a rotor, also known as primary member or simply "primary" and a stator, also known as secondary member or simply "secondary", the primary being integral with the spindle mounting slide, and the secondary being integral with the vertical slideway of the slide.

The spindle mounting slide is usually connected to a counterweight designed to balance the slide itself during its vertical movement.

Experiments have shown that, in prior art machines of the type described above, the oscillating frequency of the system consisting of the spindle mounting slide and the counterweight, caused by the rigidity of the system itself, is incompatible with the translational motion of the mobile primary member of the linear electric motor and of the spindle mounting slide integral with it. Incompatible frequency means an oscillating frequency which makes it difficult to dampen the vibrations of the slide and may even lead to the instability of the system itself.

The aim of the present invention is to overcome the above mentioned disadvantage by providing a device used to drive a spindle mounting slide and equipped with a counterweight that does not interfere with the linear electric motor which provides the driving motion.

SUMMARY OF THE INVENTION

The present invention accordingly provides a machine tool with at least one spindle mounting slide extending mainly longitudinally along a defined axis and able to move in a direction parallel to said axis at least between a first raised end position and a second lowered end position relative to a fixed slideway extending in said direction, driven by at least one linear electric motor, the machine tool comprising counterweighting means for balancing the slide, said counterweighting means combining with the slide to form an oscillating system and comprising an elastic return damping element connected to the slide by at least one flexible transmission element whose rigidity is less than the rigidity of the elastic damping element so that its frequency which is determined by the oscillation of the oscillating system is such as not to negatively interfere with the operation of the linear motor.

BRIEF DESCRIPTION OF THE DRAWINGS

The invention will now be described with reference to the accompanying drawings which illustrate a preferred embodiment of it and in which.

DESCRIPTION OF THE PREFERRED EMBODIMENTS

Figure 1:
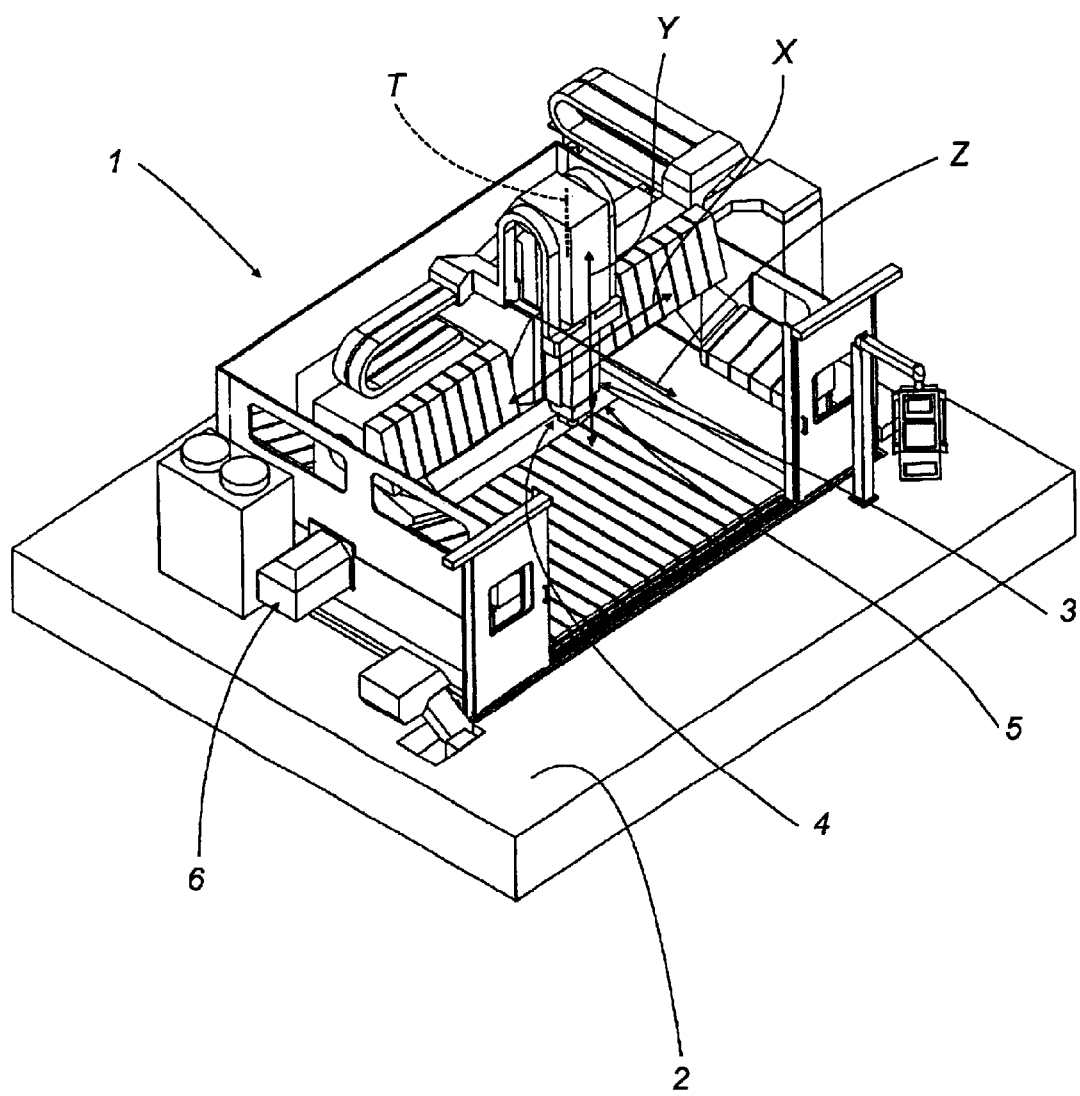
FIG. 1 is a schematic perspective view of a machine tool made in accordance with the present invention.

With reference to FIG. 1, the numeral 1 denotes in its entirety an automatic machine tool of the numeric control type mounted on a base 2. The machine 1 is equipped with an operating module 3 that can move in three-dimensional space along the three linear axes X, Y and Z of a Cartesian system.

The operating module 3 comprises a slide 4 that mounts a spindle 5 which transmits rotational cutting motion to a customary cutting tool that is not illustrated. The slide 4 extends mainly along a longitudinal axis T and can move in a vertical direction V parallel to the aforementioned Y axis between a first raised end position, illustrated in FIG. 2, and a second lowered end position, illustrated in FIG. 3.

The machine 1 illustrated in FIG. 1 is also equipped with a customary magazine, which is not illustrated in detail and is schematically labeled 6. This magazine houses a plurality of tools which the operating module 3 can access at any time during a machining cycle to automatically change tool whenever a different tool is required for a different machining operation.

Figure 2:
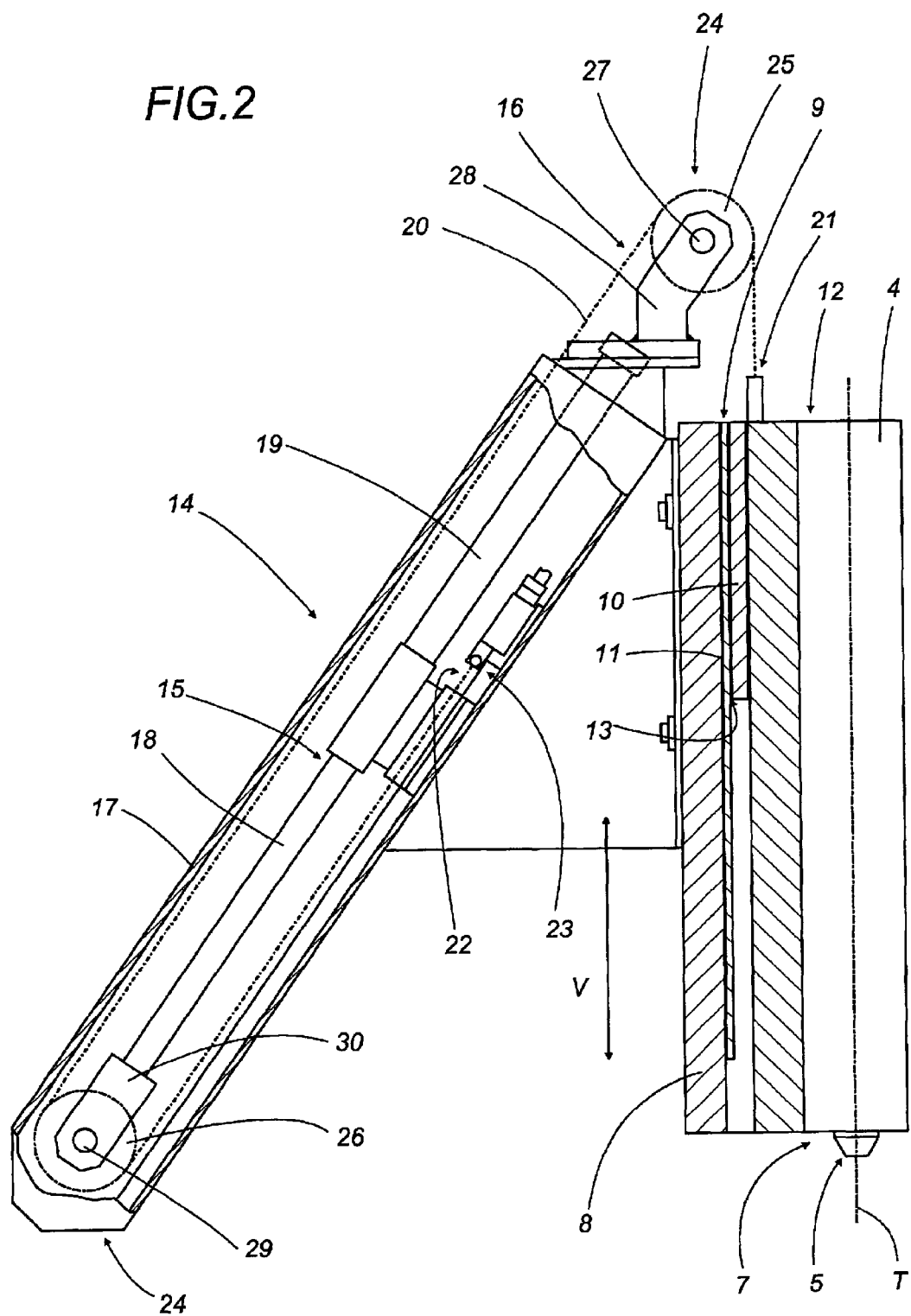
FIG. 2 is a schematic side detail view of a part of the machine tool shown in FIG. 1, and illustrates the part in a first raised operating position.
Figure 3:
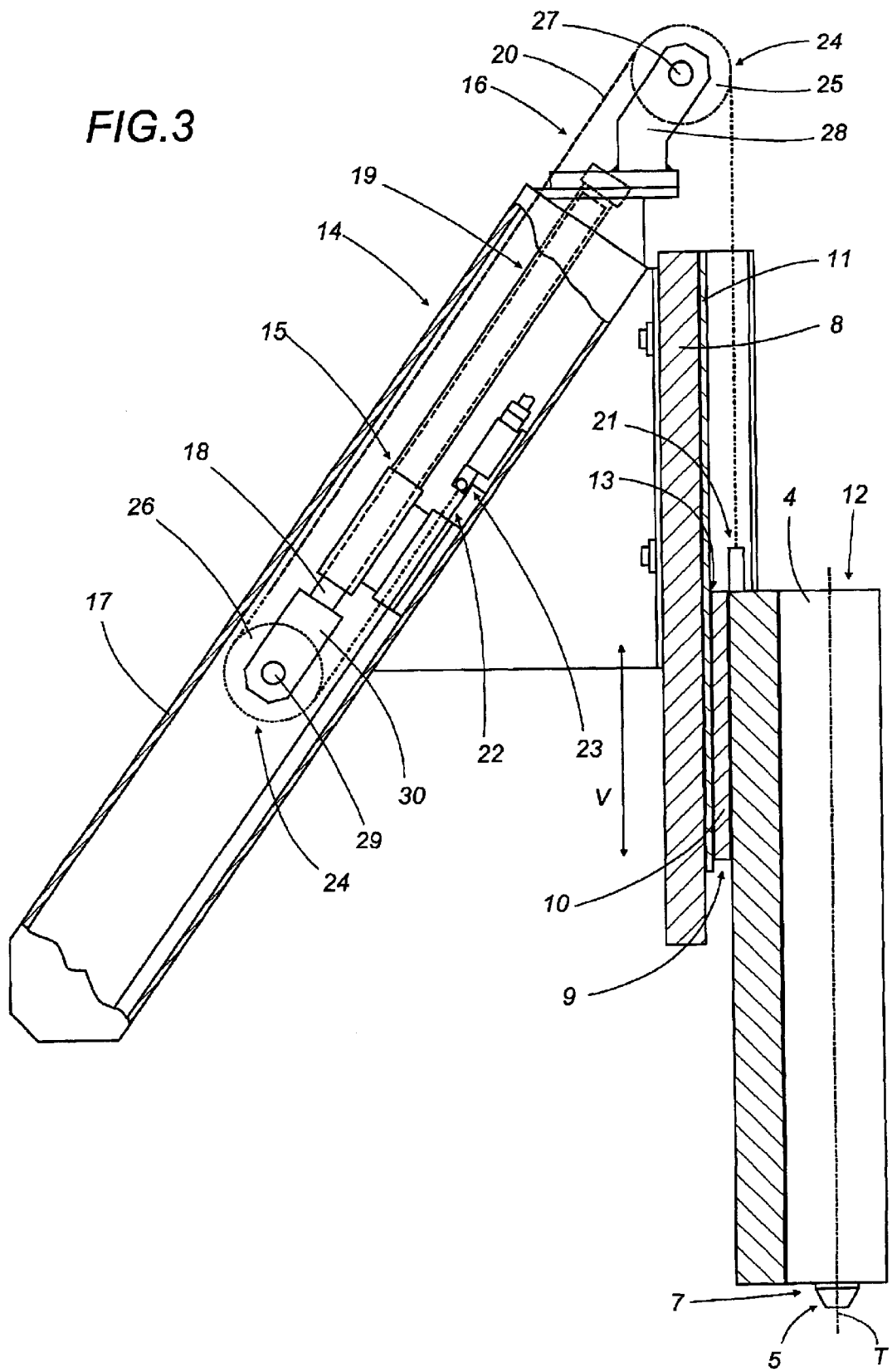
FIG. 3 is a schematic perspective detail view of the part shown in FIG. 2, and illustrates the part in a second lowered operating position.

As shown in FIGS. 2 and 3, the lower end 7 of the slide 4 mounts the spindle 5 to which the aforementioned tools (not illustrated) are fitted.

The slide 4 is supported and guided in its vertical movement by a slideway 8 that is mounted in fixed position relative to the vertical direction V and also extending longitudinally along the direction V itself.

The slide 4 is driven by a linear electric motor 9 comprising a primary member or rotor 10 and a secondary member or stator 11.

Again with reference to FIGS. 2 and 3, the primary member or rotor 10 is mounted on and connected to the slide 4 at an upper end 12 of it, opposite the aforementioned lower end 7.

The secondary member or stator 11 extends longitudinally along the full length of the slideway 8 and is integral with the slideway.

The primary member 10 and the secondary member 11 are positioned opposite each other and separated by a suitable air gap 13 according to the known operating principle of linear electric motors.

The slide 4 is supported and guided in its vertical movement in direction V by appropriate sliding guide means which form a sliding fit between the slide 4 and the slideway 8, said sliding guide means being of customary type and therefore not illustrated.

As shown in FIGS. 2 and 3, the slide 4 is equipped with a counterweighting device 14 designed to counterbalance the slide 4 during its rapid movement in the slideway 8 in direction V. The counterweighting device 14 substantially comprises an elastic element 15 and a flexible transmission element 16 which connects the slide 4 to the elastic element 15 itself.

The elastic element 15 is housed in a tubular casing 17 which is integral with the slideway 8 that supports the slide 4 and comprises a piston 18 which, during the compression step illustrated in FIG. 3 consequent upon the lowering of the slide 4, penetrates a corresponding cylinder 19 to define a first lowered end position of the slide in which the elastic element 15 is loaded.

The piston 18 and the cylinder 19 combine to form the elastic element 15 which is of known type and therefore not described in more detail.

With reference to FIG. 2, the elastic potential energy accumulated previously forces the piston 18 out of the cylinder 19 almost completely to a position where the slide 4 occupies a second, raised end position.

Advantageously, the flexible transmission element 16 consists of a roller chain 20, a first end of which 21 is fixed to the top 12 of the slide 4, and a second end of which 22 is fixed to an adjustable anchor element 23 that is integral with the tubular casing 17.

Transmission means 24 of the chain 20, comprising two customary pulleys, namely, a first pulley 25 at the top and a second pulley 26 at the bottom, form defined paths for the movements of the chain 20 itself between the two end position of the slide 4 illustrated in FIGS. 2 and 3.

The top pulley 25 rotates freely on a pin 27 supported by a bracket 28 connected to the tubular casing 17 integral with slideway 8, whilst the bottom pulley 26 rotates freely on a pin 29 supported by a bracket 30 linked to the piston 18 of the elastic element 15.

During operation of the machine 1, the spindle mounting slide 4 moves rapidly in direction V towards and away from the workpiece.

As shown in FIG. 3, when the slide 4 reaches its lowered end position relative to the vertically fixed slideway 8, the chain 20 is tensioned and, as a result of the transmission effected by the pulleys 25, 26, compresses the elastic element 15, thus forcing the piston 18 to penetrate the cylinder 19.

As shown in FIG. 2, instead, when the slide 4 reaches its raised end position relative to the slideway 8, the action of releasing the elastic potential energy accumulated by the elastic element 15, keeps the chain 20 tensioned thanks to the pulleys 25, 26.

The counterweighting device 14 comprising the chain 20 and the elastic element 15, performs the function of balancing the slide 4 and, together with the slide 4 itself, forms a continuous oscillating system 31.

Machine operation and life depend to a very great extent on the way that machine parts vibrate and machine tool design cannot therefore be dissociated from the study of vibrations.

Although machine parts are continuous systems, with distributed mass and elasticity, and are therefore capable of vibrating with infinite degrees of freedom, it is possible, for the purposes of technical applications, to concentrate deformation on a limited number of highly deformable parts, thus assimilating the continuous system to a system having a finite number of degrees of freedom.

As mentioned above, therefore, the assembly consisting of the slide 4, the chain 20 and the elastic element 15 constitutes the continuous system 31 which, for simplicity, can be likened to a system having a finite number of degrees of freedom.

It is assumed that the elastic element 15 presents an overall value of rigidity that can be assimilated to the infinite value, where overall rigidity is used to indicate the single equivalent value of the rigidity values of the individual mechanical components forming the elastic element 15, and disregarding the fact that, as a whole, the stroke of the elastic element 15 constitutes a deformation of the element 15 itself.

According to the above, the rigidity of the chain 20 is less than the rigidity of the elastic element 15, thus creating an oscillating frequency of the system 31 such as not to negatively interfere with the operation of the linear motor 9.

Experiments have shown that optimum operation of the machine 1 can be achieved only for a frequency range from 0 to 50 Hz. In particular, the best results are obtained for frequency values not exceeding 10 Hz.

Thus, by appropriately dimensioning the chain 20 according to the mass of the slide 4 and of the other moving parts and according to the elastic constant of the elastic element 15, it is possible at the design stage, to select the characteristic frequency of the aforementioned oscillating system 31 in order to optimize its coupling with the linear motor 9.

What is claimed:

1. A machine tool with at least one spindle mounting slide extending mainly longitudinally along a defined axis and able to move in a direction parallel to said axis at least between a first raised end position and a second lowered end position relative to a fixed slideway extending in said direction, driven by at least one linear electric motor comprising a linear stator and a linear rotor, the machine tool comprising counterweighting means for balancing the slide, said counterweighting means combining with the slide to form an oscillating system and comprising an elastic return damping element connected to the slide by at least one flexible transmission element, wherein the rigidity values of the elastic element and of the flexible transmission element determine a frequency of the oscillating system that does not exceed 10 Hz so that such frequency does not negatively interfere with the operation of the linear motor.

2. The machine tool according to claim 1, wherein the flexible transmission element comprises a chain.

3. The machine tool according to claim 2, comprising means for transmitting motion to the chain.

4. The machine tool according to claim 3, wherein the transmission means of the chain comprise at least one pulley mounted in such a way that it turns freely on a supporting bracket.

5. The machine tool according to claim 4, wherein the elastic element comprises a piston that slides in a cylinder, moving between an elastically loaded position in which it is inside the cylinder and an elastically released position in which it is outside the cylinder.

6. The machine tool according to claim 5, wherein a bracket supporting the pulley is connected to the piston of the elastic element.

7. The machine tool according to claim 1, wherein the elastic element comprises a piston that slides in a cylinder, moving between an elastically loaded position in which it is inside the cylinder and an elastically released position in which it is outside the cylinder.

8. The machine tool according to claim 7, wherein a bracket supporting the pulleys is connected to the piston of the elastic element.

* * * * *